(12) United States Patent
Wu

(10) Patent No.: US 10,029,641 B1
(45) Date of Patent: Jul. 24, 2018

(54) CRASHWORTHY AND SAFE FRAME FOR VEHICLE

(71) Applicant: Leshuang Wu, Sichuan (CN)

(72) Inventor: Leshuang Wu, Sichuan (CN)

( * ) Notice: Subject to any disclaimer, the term of this patent is extended or adjusted under 35 U.S.C. 154(b) by 1 day.

(21) Appl. No.: 15/466,489

(22) Filed: Mar. 22, 2017

(30) Foreign Application Priority Data

Jan. 18, 2017 (CN) .................... 2017 2 0054618 U

(51) Int. Cl.
*B60R 21/02* (2006.01)
*B60R 21/0132* (2006.01)
*B60R 21/0136* (2006.01)
*B60R 19/00* (2006.01)
*B60R 21/01* (2006.01)

(52) U.S. Cl.
CPC .............. *B60R 21/02* (2013.01); *B60R 19/00* (2013.01); *B60R 21/0132* (2013.01); *B60R 21/0136* (2013.01); *B60R 2019/007* (2013.01); *B60R 2021/01231* (2013.01); *B60R 2021/0273* (2013.01); *B60R 2021/0293* (2013.01)

(58) Field of Classification Search
CPC . B60R 21/02; B60R 21/0136; B60R 21/0132; B60R 2021/01231; B60R 2021/0273; B60R 2021/0293; B60R 2019/0007; B60R 19/00
See application file for complete search history.

(56) References Cited

U.S. PATENT DOCUMENTS

| | | | | |
|---|---|---|---|---|
| 3,992,046 A | * | 11/1976 | Braess | B60N 2/4221 296/68.1 |
| 6,523,872 B2 | * | 2/2003 | Breed | B60R 19/00 188/377 |
| 2001/0015565 A1 | * | 8/2001 | Motozawa | B60N 2/4221 296/68.1 |
| 2003/0025342 A1 | * | 2/2003 | Belloso | B62D 39/00 293/132 |
| 2005/0116817 A1 | * | 6/2005 | Mattes | B60R 21/0136 340/436 |
| 2007/0046044 A1 | * | 3/2007 | Tanabe | B60R 21/0136 293/120 |
| 2007/0102220 A1 | * | 5/2007 | Kiribayashi | B60R 21/0136 180/274 |
| 2008/0289836 A1 | * | 11/2008 | Fong | A62C 3/07 169/62 |
| 2018/0093629 A1 | * | 4/2018 | Le | B60R 21/0136 |

FOREIGN PATENT DOCUMENTS

JP 56090747 A * 7/1981 ............. B60R 19/36

* cited by examiner

*Primary Examiner* — Drew J Brown

(74) *Attorney, Agent, or Firm* — Hovey Williams LLP

(57) ABSTRACT

Provided is a crashworthy and safe frame for a vehicle, which includes a frame body and a controller. Both sides of a front end of the frame body are respectively provided with hollow parts, and pneumatic cylinders are fixedly provided within the hollow parts, respectively. A front end of a telescopic rod of each of the pneumatic cylinders extends out of the hollow part and is connected with a rear end of one independent telescopic bumper. Each of the pneumatic cylinders is connected with one electronic air pump via a gas pipe. The electronic air pump is fixed on the frame body and connected with the controller which is connected with a main circuit of the vehicle. A pneumatic spring airbag is arranged between each of the two telescopic rods and the respective independent telescopic bumper, and connected with the electronic air pump via a gas pipe.

5 Claims, 1 Drawing Sheet

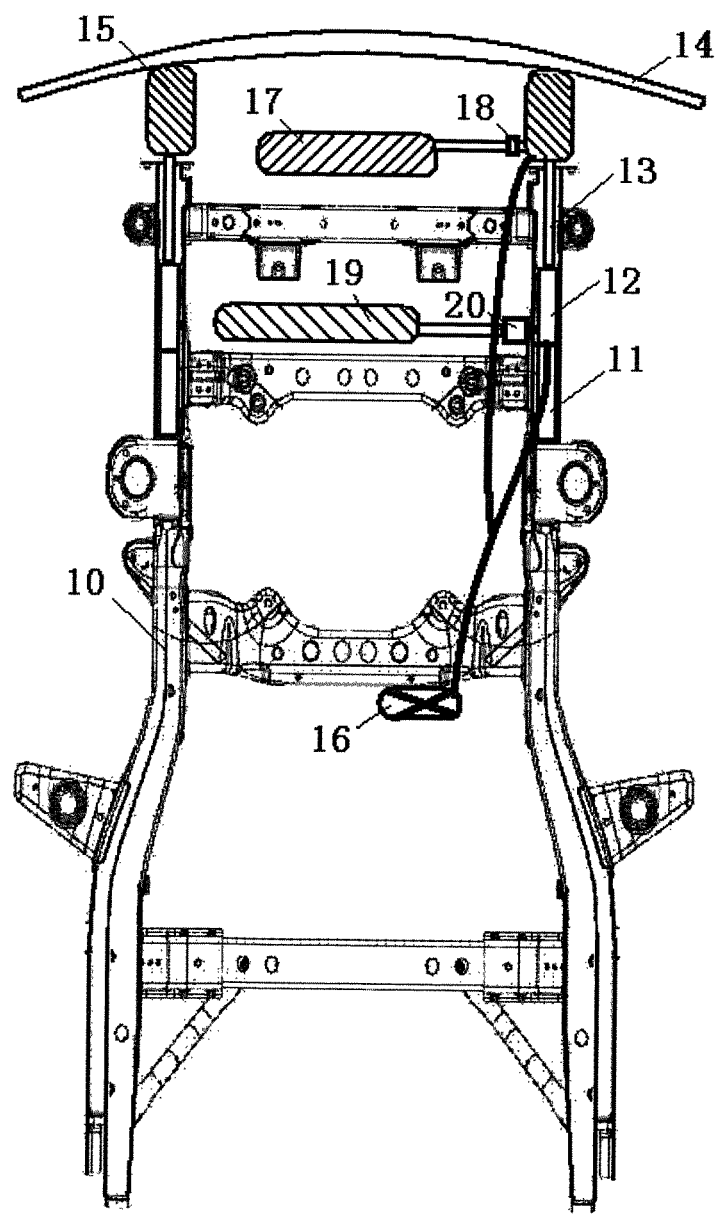

CRASHWORTHY AND SAFE FRAME FOR VEHICLE

CROSS-REFERENCE TO RELATED APPLICATIONS

The present applications claims the priority benefit of Chinese utility model application No. 201700546185, filed Jan. 18, 2017, incorporated by reference herein in its entirety.

TECHNICAL FIELD

The present application relates to the technical field of vehicle frame improvements, and particularly to a crashworthy and safe frame for a vehicle.

BACKGROUND ART

With the rapid development of society, vehicles have become important for transportation in the society of today, but vehicles also bring many potential safety hazards to people. For example, it would pose life threatening hazards to drivers. Traffic accidents can never be prevented during driving. People's life and property can be safeguarded only if more safety protection is applied to vehicles in the manufacturing process.

DISCLOSURE OF THE APPLICATION

On this basis, after many years of research and practice, the inventor proposes a universal airbag-type crashworthy and protective vehicle frame, in order to reduce a great impact on vehicles caused by a direct hard-to-hard bump during a collision, as the inventor finds that the existing vehicle frame is in an all-steel frame structure, and thus, in case of collision caused by a mechanical failure or a variety of factors during a vehicle's running, the vehicle would have a hard-to-hard bump against an object, which would cause, due to the great impact that brought by the collision to the vehicle frame, the vehicle frame to be deformed and even scrapped and also endanger the life safety of passengers on board.

In view of the above-mentioned deficiencies, after hard research and design and in combination with experiences and achievements of long-time engagement in the related industry, the designer of the present application designed a crashworthy and safe frame for a vehicle, to overcome the above-mentioned deficiencies.

An object of the present application is to provide a crashworthy and safe frame for a vehicle, which is simple in structure and convenient in maintenance, and can overcome the technical deficiencies of an existing vehicle frame, and provide safety assurance for the vehicle.

In order to solve the above-mentioned problems, the present application discloses a crashworthy and safe frame for a vehicle, which includes a frame body and a controller, where both sides of a front end of the frame body are respectively provided with hollow parts, pneumatic cylinders are fixedly provided within the hollow parts, respectively, a front end of a telescopic rod of each of the pneumatic cylinders extends out of the hollow part and is connected with a rear end of one independent telescopic bumper, each of the pneumatic cylinders is connected with one electronic air pump via a gas pipe, the electronic air pump is fixed on the frame body and is connected with the controller, the controller is connected with a main circuit of the vehicle, and a pneumatic spring airbag is arranged between each of the two telescopic rods and the respective independent telescopic bumper, and the pneumatic spring airbag is connected with the electronic air pump via a gas pipe.

Specifically, a front safety airbag is arranged between a headstock and an engine, and the front safety airbag is connected with the pneumatic spring airbag.

Specifically, a gas outlet control valve is further arranged between the front safety airbag and the pneumatic spring airbag, and the gas outlet control valve is connected with the controller, so as to be opened to feed gas to the front safety airbag in case of collision.

Specifically, a front curtain airbag is arranged between an engine and a front windshield, and the front curtain airbag is connected with the pneumatic cylinder.

Specifically, a gas outlet control valve is further arranged between the front curtain airbag and the pneumatic cylinder, and the gas outlet control valve is connected with the controller, so as to be opened to feed gas to the front curtain airbag in case of collision, thereby providing an effective protection for the front windshield.

As seen from the above-mentioned structure, the crashworthy and safe frame for a vehicle provided by an embodiment of the present application has the following effects:

1. it is simple in structure, convenient in disassembly and assembly and maintenance, and can be easily applied to an existing vehicle; and
2. it provides multi-protection, and can provide safety protection in time for the overall vehicle and passengers on board, and thus is high practical.

The details of the present application can be obtained from the following description and the accompanying drawing.

BRIEF DESCRIPTION OF THE DRAWING

FIG. 1 shows a structural schematic view of a crashworthy and safe frame for a vehicle provided by an embodiment of the present application.

REFERENCE SIGNS

10—frame body; 11—hollow part; 12—pneumatic cylinder; 13—telescopic rod; 14—independent telescopic bumper; 15—pneumatic spring airbag; 16—electronic air pump; 17—front safety airbag; 18—gas outlet control valve; 19—front curtain airbag; and 20—gas outlet control valve.

DETAILED DESCRIPTION OF THE EMBODIMENTS

Referring to FIG. 1, it shows a crashworthy and safe frame for a vehicle provided by an embodiment of the present application.

The crashworthy and safe frame for a vehicle includes a frame body 10 and a controller (not shown). Both sides of a front end of the frame body 10 are provided with hollow parts 11, respectively. Pneumatic cylinders 12 are fixedly provided within the hollow parts 11, respectively. A front end of a telescopic rod 13 of each of the pneumatic cylinders 12 extends out of the hollow part 11 and is connected with a rear end of one independent telescopic bumper 14. Each of the pneumatic cylinders 12 is connected with one electronic air pump 16 via a gas pipe. The electronic air pump 16 may be fixed on the frame body 10 via a fastening structure such as a bolt, and the electronic air pump 16 is connected with the controller. The controller is connected with a main circuit of the vehicle, e.g., a console unit and a speed detector on the vehicle, so as to obtain a speed signal, a temperature signal and other signals of the vehicle, and control gas filling to be performed when the vehicle reaches a certain speed (e.g., 40 kilometers per hour), so that the independent telescopic bumper 14 is put out by a telescopic motion of the telescopic rod 13 in the pneumatic cylinder 12.

A pneumatic spring airbag 15 is arranged between each of the two telescopic rods 13 and the respective independent telescopic bumper 14. The pneumatic spring airbag 15 may be made of rubber, and the pneumatic spring airbag 15 is connected with the electronic air pump 16 via a gas pipe, so that the pneumatic spring airbag 15 is filled with gas while the independent telescopic bumper 14 is put out, for providing a second-level buffer.

Preferably, a front safety airbag 17 is arranged between a headstock and an engine, and the front safety airbag 17 may be connected with the pneumatic spring airbag 15. Preferably, a gas outlet control valve 18 is further arranged between the front safety airbag 17 and the pneumatic spring airbag 15, and the gas outlet control valve 18 is connected with the controller, so as to be opened to feed gas to the front safety airbag 17 in case of collision, thereby providing an effective protection for the engine.

Preferably, a front curtain airbag 19 is arranged between the engine and a front windshield, and the front curtain airbag 19 is connected with the pneumatic cylinder 12 so that compressed air within the pneumatic cylinder may be filled into the front curtain airbag 19 in time in case of collision, thereby providing further protection. Optionally, a gas outlet control valve 20 is further arranged between the front curtain airbag 19 and the pneumatic cylinder 12, and the gas outlet control valve 20 is connected with the controller, so as to be opened to feed gas to the front curtain airbag 19 in case of collision, thereby providing an effective protection for the front windshield.

As can be seen, the present application provides a crashworthy vehicle frame, where by adding, on the basis of an existing vehicle frame, a pneumatic spring airbag, a pneumatic cylinder, a safety airbag in front of the engine, and a curtain airbag in front of the windshield, this frame forms a full-set crashworthy control system, and can be applied to various types of vehicles. The independent telescopic bumper is such a bumper that is pulled out forwards automatically by the telescopic rod of the cylinder when the vehicle travels at a speed above 40 kilometers per hour, so that in case of collision, the vehicle has a backward compression space, which enables the pneumatic spring airbag to play a role in reducing the pressure, thereby reducing the huge impact on the vehicle body. That is, the independent bumper provides a first-level protection. As for the pneumatic spring airbag, the crashworthy system for the frame includes a control assembly arranged within the vehicle body and is designed with an electronic air pump for supplying gas to the crashworthy system of the vehicle frame, in this case, a high intensive pneumatic spring airbag is added at a place where the vehicle frame is jointed with the bumper, so that air is filled into the pneumatic spring airbag when the vehicle is started up, and furthermore, the air pressure within the this airbag is controlled by an electronic control system to form thereby a crashworthy system of a high pressure gas and a high intensive pressure spring.

This pneumatic spring airbag releases a high pressure gas in case of collision, so that a pressure control switch is automatically opened for supplying gas to a first engine airbag. This makes the airbag deployed, so as to reduce the impact strength, while assuring the safety of the engine. The pneumatic spring airbag can partially reduce the force of the collision. That is, second-level and third-level protections are provided.

In the entire telescopic cylinder-type air pressure protection system, when the vehicle travels at a speed of 40 kilometers per hour, the air pump automatically fills the cylinder with air, and an automatic gas switch controls the air pressure within the cylinder to be a set value so that a gas rod extends out by 20 to 30 centimeters and thus the vehicle bumper is simultaneously put out forwards or backwards. In case of collision of the vehicle, due to a great pressure brought by the first-level protection of the independent bumper and the second-level and third-level protections of the spring airbag and the front safety airbag, a high pressure is exerted backwards, which causes an automatically controlled pressure switch within the cylinder to be opened, and thus, the front windshield curtain airbag of the vehicle is deployed. This is, fourth-level and fifth-level protections are provided. During such a collision process, due to the enabling of such five-level protections of the system, the hard-to-hard bump of the vehicle can be effectively improved, so that structures of the vehicle frame and the vehicle body are not deformed, and people's life safety can be effectively assured. When the vehicle stops running, the telescopic rod of the cylinder is controlled by an electronic switch valve, so that the gas rod gets back into its original position. All the airbags provide a best method of protecting the vehicle in case of collision, they are easy to install without changing the structure of the vehicle frame and the appearance of the vehicle. Furthermore, the independent telescopic vehicle bumper, the high intensive pneumatic spring airbag, and the cylinder-type telescopic system form a complete set of safe and collision-resistant frame system, and this system is applicable to various types of vehicles and is a requisite safety system for a novel modern vehicle.

Apparently, the above description and disclosure are merely illustrative and not intended to limit the disclosure, applications or use of the present application. Although the present application has been described in the embodiments and these embodiments have been described in the drawing, the present application does not limit the specific examples, that are illustrated in the drawing and described in the embodiment, as the best mode for implementing the teaching of the present application, and the scope of the present application would cover any embodiment falling within the preceding specification and appended claims.

The invention claimed is:

1. A crashworthy and safe frame for a vehicle, comprising a frame body and a controller,
   wherein both sides of a front end of the frame body are respectively provided with hollow parts, pneumatic cylinders are fixedly provided within the hollow parts respectively, a front end of a telescopic rod of each of the pneumatic cylinders extends out of the hollow part and is connected with a rear end of one independent telescopic bumper, each of the pneumatic cylinders is connected with one electronic air pump via a gas pipe, the electronic air pump is fixed on the frame body and is connected with the controller, the controller is connected with a main circuit of the vehicle, and a pneumatic spring airbag is arranged between each of the two telescopic rods and the respective independent telescopic bumper, and the pneumatic spring airbag is connected with the electronic air pump via a gas pipe.

2. The crashworthy and safe frame for a vehicle according to claim 1, wherein a front safety airbag is arranged between a headstock and an engine, and the front safety airbag is connected with the pneumatic spring airbag.

3. The crashworthy and safe frame for a vehicle according to claim 2, wherein a gas outlet control valve is further arranged between the front safety airbag and the pneumatic spring airbag, and the gas outlet control valve is connected with the controller, so as to be opened to feed gas to the front safety airbag in case of collision.

4. The crashworthy and safe frame for a vehicle according to claim 1, wherein a front curtain airbag is arranged between an engine and a front windshield, and the front curtain airbag is connected with the pneumatic cylinder.

5. The crashworthy and safe frame for a vehicle according to claim 4, wherein a gas outlet control valve is further arranged between the front curtain airbag and the pneumatic cylinder, and the gas outlet control valve is connected with the controller, so as to be opened to feed gas to the front curtain airbag in case of collision, thereby providing an effective protection for the front windshield.

* * * * *